United States Patent [19]  [11]  4,186,976
Okada  [45]  Feb. 5, 1980

[54] FABRICATED DESK

[75] Inventor: Akihiro Okada, Neyagawa, Japan

[73] Assignee: Itoki Kosakusho Co., Ltd., Joto, Japan

[21] Appl. No.: 891,810

[22] Filed: Mar. 30, 1978

[30] Foreign Application Priority Data

Aug. 31, 1977 [JP] Japan ............................... 52-105139

[51] Int. Cl.² ............................................ A47B 17/00
[52] U.S. Cl. ................................... 312/194; 312/195;
      312/111; 312/257 SK; 403/321; 312/263
[58] Field of Search ............... 312/194, 195, 107, 111,
                          312/257 SK, 263; 403/321, 361

[56] References Cited

U.S. PATENT DOCUMENTS

| 2,553,835 | 5/1951 | Sachs | 403/321 |
| 3,104,138 | 9/1963 | Renaud | 312/195 |
| 3,181,923 | 5/1965 | Guillon et al. | 312/195 |
| 3,182,846 | 5/1965 | Kaff | 312/257 SK |
| 3,401,995 | 9/1968 | Ogden | 312/195 |
| 3,565,502 | 2/1971 | Bracy et al. | 312/195 |
| 3,586,409 | 6/1971 | Cisler | 312/111 |
| 3,995,923 | 12/1976 | Shell | 312/111 |

FOREIGN PATENT DOCUMENTS

| 1310959 | 10/1962 | France | 312/195 |
| 85651 | 12/1965 | France | 312/195 |
| 807110 | 1/1959 | United Kingdom | 312/111 |
| 1326641 | 8/1973 | United Kingdom | 312/195 |

Primary Examiner—Victor N. Sakran
Attorney, Agent, or Firm—Armstrong, Niakaido, Marmelstein & Kubovcik

[57] ABSTRACT

A fabricated desk comprising a top board and top board supporting members. The top board supporting members include paneled legs and drawer holding paneled frames. The top board and the top board supporting members are rigidly interconnected by locking devices interposed between locking mechanism mounting apertures provided on the underside of the top board and top board mounting parts provided on the top end of the top board supporting members.

28 Claims, 10 Drawing Figures

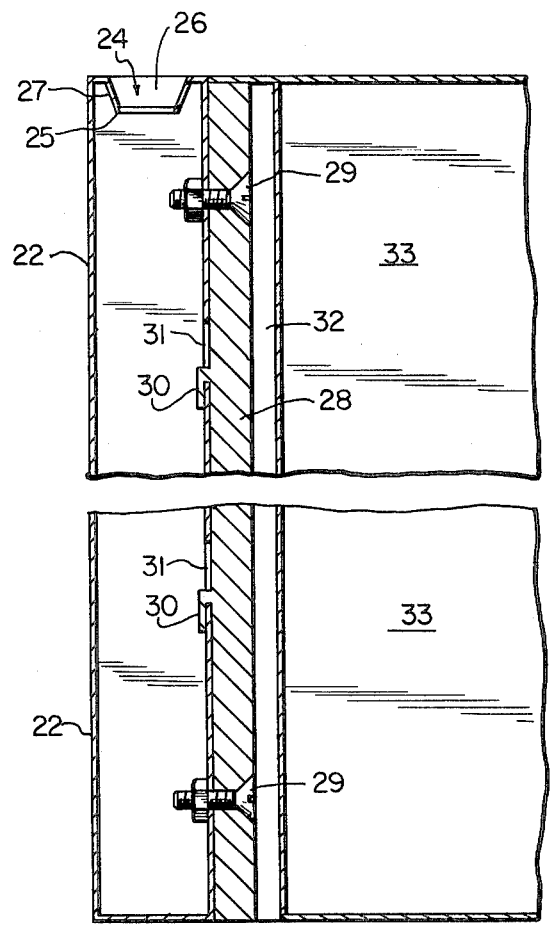
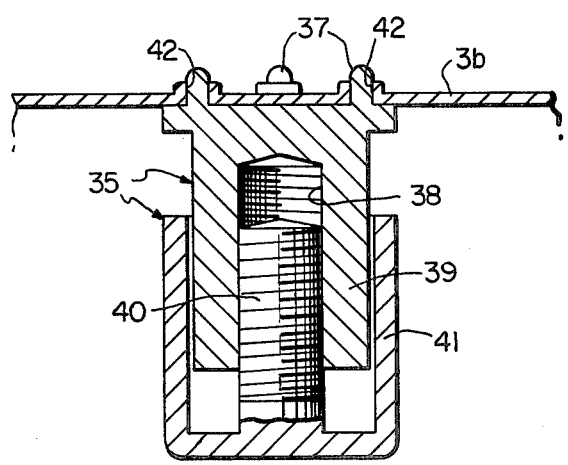
FIG. 9
FIG. 10

FABRICATED DESK

BACKGROUND OF THE INVENTION

1. Field of the Invention

This invention relates to a desk that is easy to fabricate, structurally rigid after fabrication, and which can be conveniently transported and stored.

2. Description of the Prior Art

In the past, desks for use in business or for study were produced with all of the parts such as the top board, paneled leg, paneled frame and paneled curtain assembled into a completed unit in a mass production system. The various component parts of the desk were interconnected by means of set screws in the assembly line, and the desks were delivered as an assembled unit to the selling agents who keep such desks in stock for future sale. Therefore, an assembly line had to be set up in a manufacturer's workshop where a number of workers were assigned the task of setting from twenty to thirty screws into each desk. Moreover, the assembled desk is extremely bulky, thereby increasing the expense for transportation and storage.

Further, the bulkiness of the completely assembled desk unit causes difficulty in carrying the desk through narrow passages or staircases, and occasionally invites damage to the desk, resulting in many additional problems, such as buyers' claims for damage.

SUMMARY OF THE INVENTION

The primary object of this invention is to provide a desk capable of being fabricated with fixed or movable setting means provided on each of the top board, supporting members and paneled curtain of the desk, in view of the problems inherent in conventional desks.

Another primary object of this invention is to provide a desk requiring almost no troublesome screw setting assembly line work and which can be assembled at any time, and which is easy to handle by virtue of being packaged for transport and storage in a less bulky form.

A further object of this invention is to provide a desk of sturdy construction wherein the various top board supporting members can be used in various different combinations for supporting a given top board.

It is a further object to provide a desk comprising a top board, a plurality of mounting apertures located on an underside of the top board, a plurality of top board supporting members, a plurality of mounting parts located in each of the supporting members and a plurality of locking means. Each locking means including a first portion adapted for attachment to a selected one of the top board mounting apertures and a second portion adapted to be inserted into a selected one of the supporting member mounting parts for mounting the top board to the supporting members.

BRIEF DESCRIPTION OF THE DRAWING

FIG. 9 is a sectional view showing the fixing beam inserted into a holding groove provided on the outer end of the paneled curtain; and FIG. 10 is an enlarged sectional view of a height-adjusting foot piece fixed to a paneled leg.

DESCRIPTION OF THE PREFERRED EMBODIMENT

Figure 1:
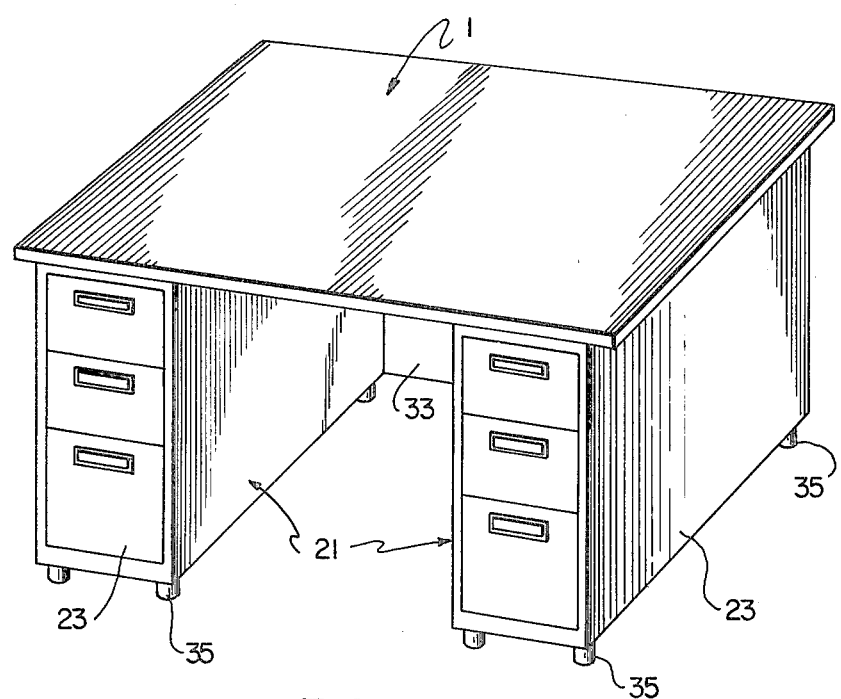
FIG. 1 is a perspective view of a desk completely fabricated by employing two paneled frames as the top board supporting members.
Figure 2:
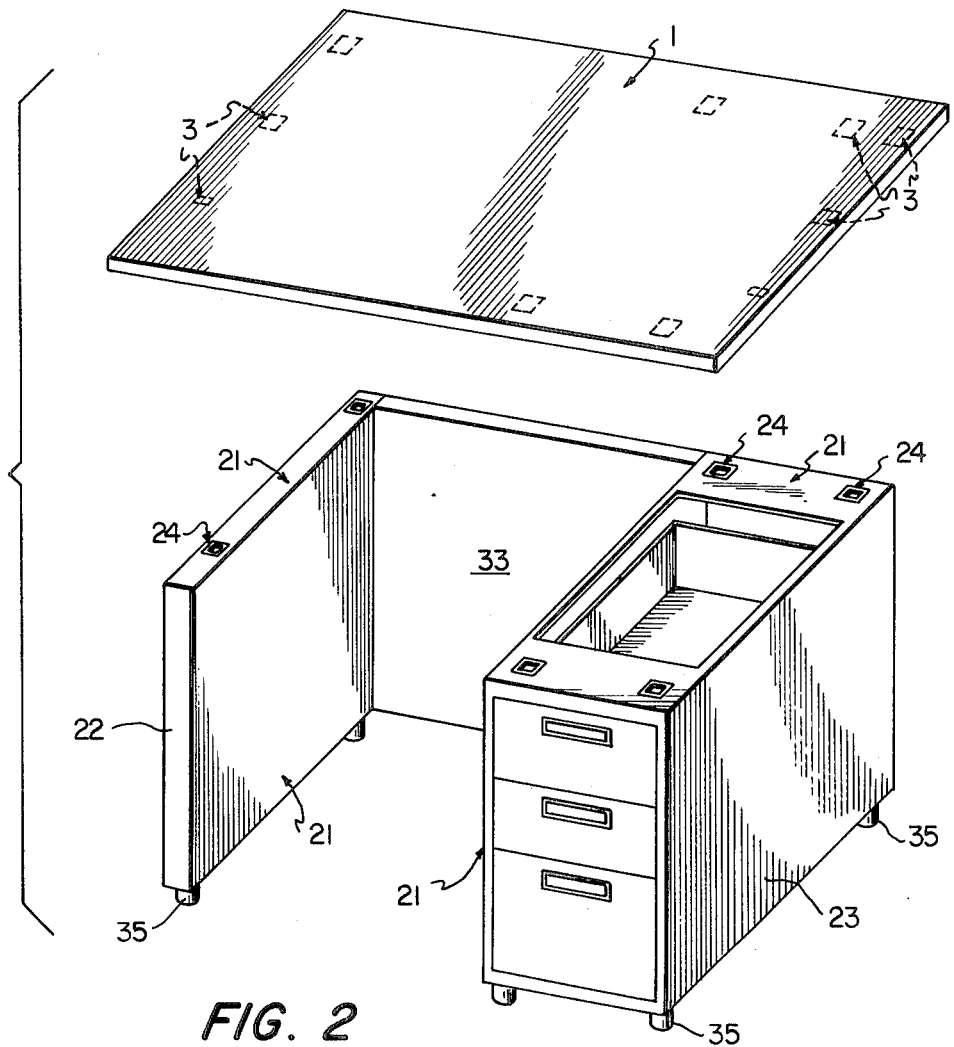
FIG. 2 is an exploded perspective view of a desk, with the top board removed, comprising a paneled leg and a paneled frame.

FIG. 1 shows a desk fabricated according to a preferred embodiment of this invention, and FIG. 2 is an exploded view thereof, having a modified configuration.

The fabricated desk according to this invention comprises a top board provided with an adequate number of locking mechanism mounting apertures on the underside thereof; top board supporting members provided with top board mounting parts on the top end thereof for supporting the top board locking devices; locking devices interposed between the locking mechanism mounting apertures on the underside of the top board and the top board mounting parts on the top ends of the top board supporting members; a paneled curtain; and fixing beams and cooperating holding grooves provided on both ends of the paneled curtain and on the forward sides of the top board supporting members.

Figure 3:
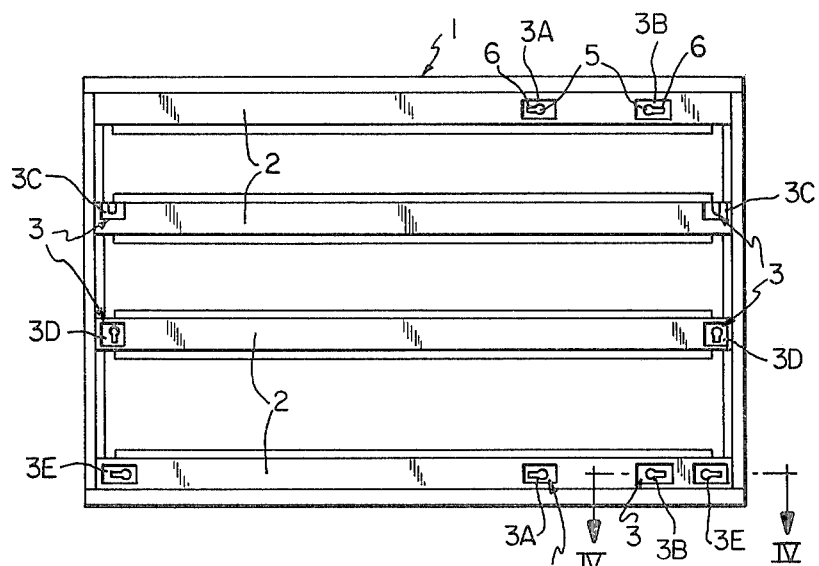
FIG. 3 shows the underside of the top board illustrated in FIG. 2.
Figure 4:
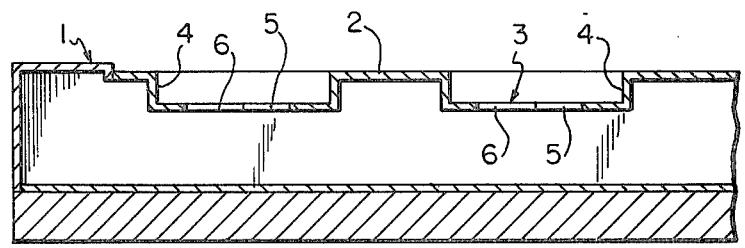
FIG. 4 is an enlarged view taken along the line IV—IV in FIG. 3.
Figure 5:
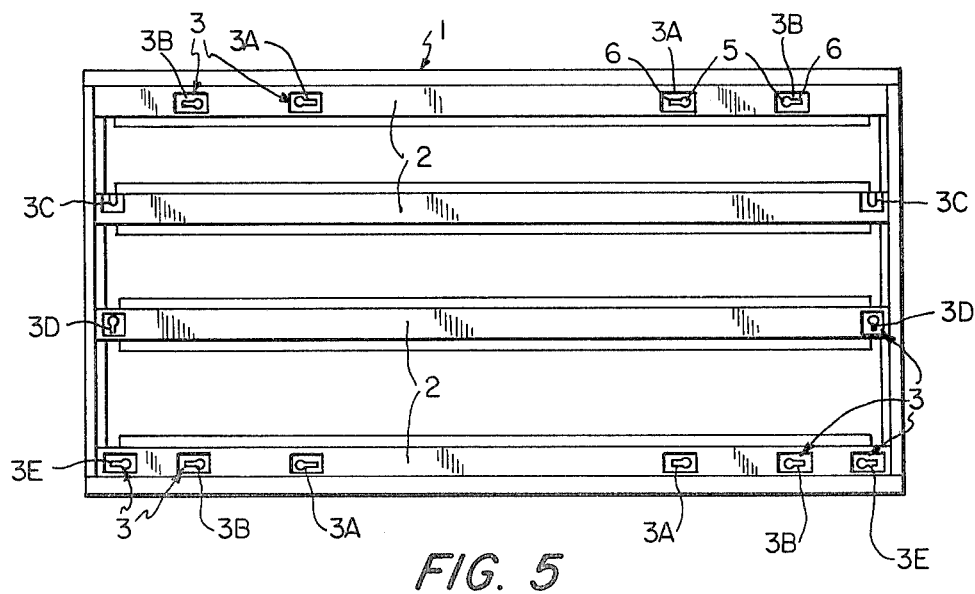
FIG. 5 shows the underside of the top board illustrated in FIG. 1.

In the drawings, 1 indicates a top board which is similar to one for a conventional steel desk in basic configuration, but which is provided with reinforcing channels 2 which are welded to the underside thereof so that a plane passing through the flanged edges of the channel would be parallel to the top surface of the top board 1, thereby reinforcing the top board and providing space for forming the locking mechanism mounting apertures 3, for receiving the locking devices 7. Each locking mechanism mounting aperture is provided with an engagement hold 6 and an insertion-removal hold 5 which together take the form of a key hole as seen in the drawing. The key hole shape is formed by the union of the two holes 5 and 6. The insertion-removal hole 5, drilled in the form of a circle or square, is located on the bottom surface of a stepped recess 4 provided on the flat surface of the reinforcing channel 2, and the other adjacent engagement hole 6 is formed extending in one direction and being narrower than the insertion-removal hole 5. As seen in the embodiment of FIGS. 3 and 5, the longitududinal directions of the engagement holes 6 in each of the locking mechanism mounting apertures 3, which are provided on the top board side of the reinforcing channels 2 and which are arranged at several locations on the underside of the top board 1, are not all arranged parallel to each other. In FIG. 3, the locking mechanism mounting apertures 3 are shown disposed in alignment with each other in the vertical direction so that the later-described paneled legs serving as one of said top board supporting members can be secured thereto on the left side, and on the right side each of the locking mechanism mounting apertures 3A and 3B, respectively, for securing the later-described paneled frame are disposed in vertical alignment in 2 rows, locking mechanism mounting apertures 3C, 3D, and 3E for securing the paneled leg being disposed symmetrically at opposite ends of the top board.

In at least two of the locking mechanism mounting apertures on one side of this embodiment, for example, 3D for 3E, 3C for 3E, or 3B, 3B for 3A, 3A, the arrangement of the engagement holes 6 are different in the longitudinal direction in a plane so as to prevent the top board and supporting members from sliding relative to one another after the top board is fixed to the supporting members.

The locking mechanism mounting apertures 3 may also be provided in such a way that they are directly formed on the underside of the top board 1 or, instead, metal pieces fixed to the underside of the top board may be used solely for those parts.

Figure 7:
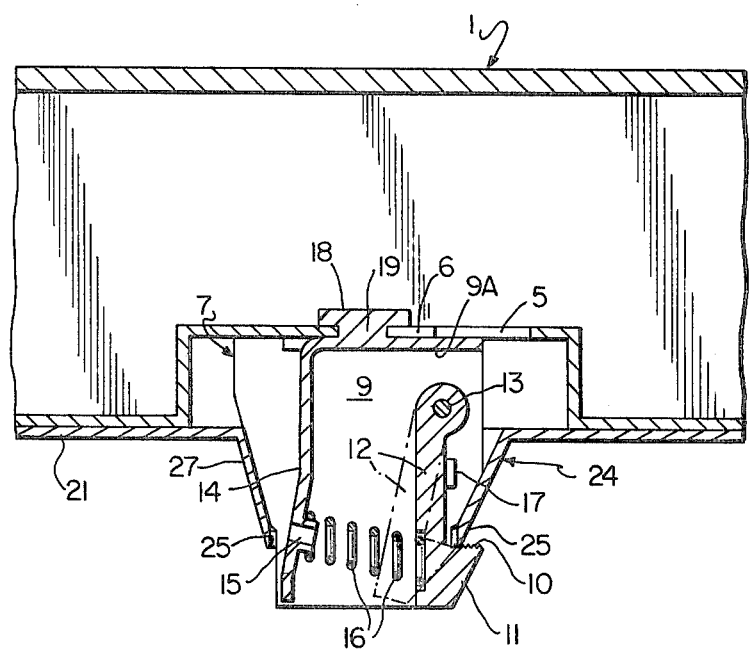
FIG. 7 is an enlarged sectional view showing the top board fixed to the top board supporting member by means of the locking device illustrated in FIG. 6.
Figure 6:
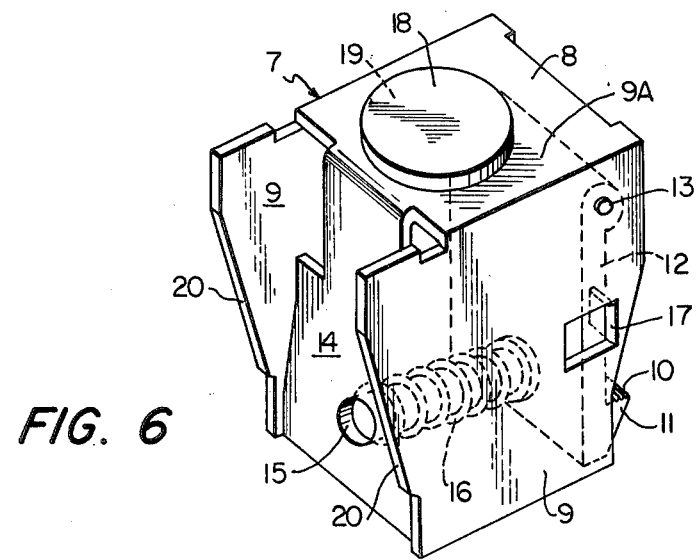
FIG. 6 is an enlarged perspective view of a locking device.

FIGS. 6 and 7 illustrate a preferred embodiment of the locking device 7. The locking device 7 includes a head part 18 in the shape of a pin. The head is adapted to fit through the insertion-removal hole 5 of the locking mechanism mounting apertures 3, and a neck 19 extending downwardly from the head is attached to the upper surface of a frame 8. The frame 8 has a vertical section in the shape an inverted L, as shown in FIGS. 6 and 7. The frame 8 which forms the leg locking part of the locking device 7, comprises an upper plate 9A, a downwardly formed extension thereof serving as a support piece 14, and side plates 9, 9 extending on both sides of the support piece 14. The side plates 9, 9 form flat plates in the shape of an inverted trapezoid formed by a tapered part 20 extending from the upper plate 9A. The frame 8 has a box-like form, with the bottom part and side opposite to the support piece being open.

A vertically extending locking detent piece 12 is located on the frame 8 near the open side of the frame. An upper portion of the detent 12 is pivotally supported by both side plates 9, 9 through a pin 13. A notched non-skid surface 10 is provided on a hook-like protrusion 11 which extends perpendicular to the longitudinal direction of the locking piece 12. The hook-like protrusion 11 extends perpendicular to the length of the detent 12 and tapers off to a point as seen in vertical cross-section. A tapered portion 11A, which lies under the non-skid surface and forms a wedge-like shape in vertical section, i.e., wide at top and narrow at bottom, protrudes sideways from the lower part of the inverted trapezoidal side plates 9, 9. The detent 12, including the notched non-skid surface 10 and the tapered portion 11A, forms a hook-like protrusion 11 extending outwardly in one direction. A stopper 17 is provided between the side plates 9, 9 which abutts against a front part of the locking piece 12. A compression spring 16 acting in a direction toward the stopper 17 is provided between the rear of the locking piece 12 and a seat 15 provided on the support piece 14.

Although the upper surface of the hook-like protrusion 11 has been described as perpendicular to the longitudinal direction of the locking piece 12, an upper surface that is slantwise as descending outwardly and having a non-skid part (not illustrated herewith) thereon, could be provided, and it would perform an adjustment function to correct dimensional variations possibly occuring in various parts of this device during the manufacturing process and would also serve to provide a secure tight attachment to the later-described top board mounting part.

In the drawings, 21 indicates the top board supporting members. In the embodiments shown in FIGS. 1 and 2, a desk unit consists of a thick paneled leg having a hollow therewithin and a paneled frame 23 which serves as a cabinet furnished with drawers, both of which are optionally and properly combined. So, in FIG. 1, a pair of paneled frames 23, 23 and corresponding paneled curtain 33 are used and a top board 1 as shown in FIG. 5 is mounted thereon. In FIG. 2, a paneled leg 22 and paneled frame 23 are used with a paneled curtain 33 interposed therebetween, with a top board as shown in FIG. 3 being used. Any one of the top boards as above are usable with a pair of paneled legs 22, 22, and it will be apparent from the later description that the objects of this invention are not varied even when paneled legs 22 of short depth (not shwon), paneled frames differing in size from that embodiment, paneled curtains corresponding to the abovesaid frame in size, and top boards as abovesaid are used in combination.

Top board mounting parts 24 are provided on the top edge surface of the top board supporing members 21. The top board mounting parts 24 are in the form of recesses adapted to receive the leg locking parts of the locking device 7, which are secured to the underside of the top board 1.

The details of the locking mechanism will now be described. The locking device 7 is fixed to the top board 1 in such a way that the head part 18 of the locking device 7 is inserted into the inside of top board 1 from the underside through the insertion-removal hole 5 of the locking mechanism mounting apertures 3. The locking device 7 is then shifted along and through the engagement hole 6 adjacent to the insertion-removal hole 5 so that the neck part 19 under the head 18 moves forward and is positioned in the engagement hole 6. The top board mounting parts 24 are provided in such a way that recesses in the form of inverted truncated rectangular pyramids are provided on the top parts of the top board supporting members 21 which correspond to the locking devices fixed to the top board 1. The internal configuration of the top board mounting parts 24 conform generally with the tapered surfaces 20 of the side plates 9, 9, and the bottoms of the recesses cut away and made rectangularly open serve as engagement openings 25 having sharpened edges formed by tapered guide surfaces 27 extending between the bottoms and the upper edges of fixing openings or recesses 26.

Figure 8:
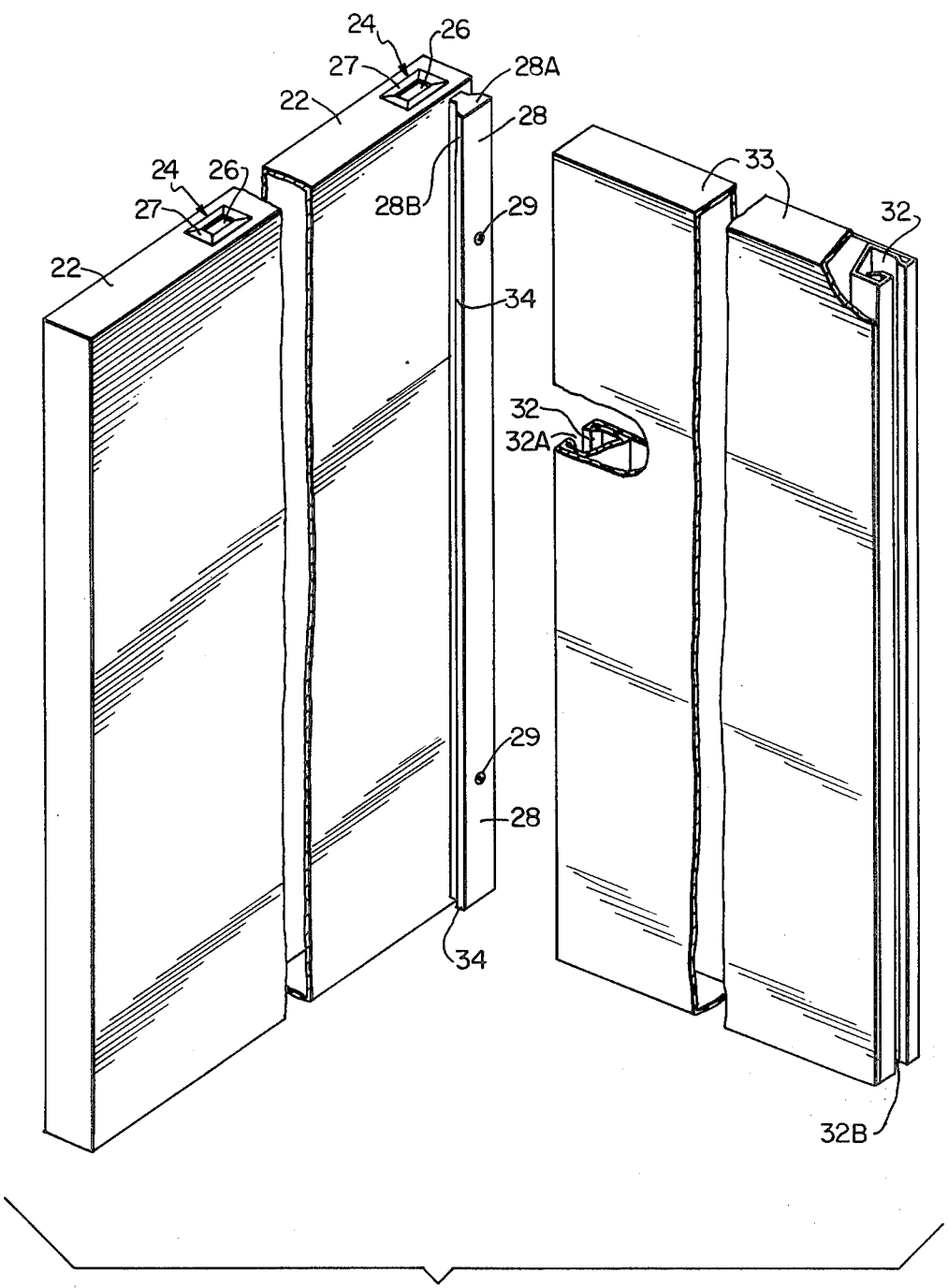
FIG. 8 is a perspective view showing a fixing beam secured to a paneled leg which is one of the top board supporting members, together with a paneled curtain.

As shown in FIGS. 8 and 9, fixing or attachment beams 28 are in the form of bars having an approximate T-shape in cross-section. The fixing beams 28 are secured by means of mounting pieces, such as nuts and bolts or screws, to the front end portions of the board supporting members 21, 21. The fixing beam includes a wide holding flange 34, which forms the cross bar of the T-shape and which is in parallel with and apart from the inwardly facing surface of the top board supporting member 21.

FIG. 9 illustrates another means for interconnecting the legs, supporting members and curtain. Downwardly directing hooked tabs 30 are provided which are inserted into the side panel of the top board supporting member through the long holes 31. The fixing beam is then positioned so that the tips of the hooks 30 are brought into engagement with the lower parts of the long holes 31 of the side panel.

The attachment beam 28 is slightly shorter than the height of the top board supporting member 21, the top end of the attachment beam being used as an engaging surface 28A for the paneled curtain. A part of holding flange 34 adjoining the engaging surface 28A is thinner than the rest of the holding flange and serves as a guiding part 28B. The cooperating holding groove 32, which is wider than and lies deeper with respect to the body of paneled curtain than the long groove 32A that is substantially a part of each edge portion of the paneled curtain 33 corresponding to the fixing beam 28, is provided with the top end thereof closed and the bottom end open. The attachment beam 28, which includes the holding flanges 34, is brought into engagement with the holding groove 32 through the long groove opening 32A, and thus the top board supporting members 21, 21 are interconnected as the upper inside top part of the holding groove 32 closed by the upper end of the paneled curtain 33 is engaged with the upper engaging surface 28A of the attachment beam 28. Incidentally, in the embodiment shown in the drawing, the long groove opening 32A and holding groove 32 of the paneled curtain 33 are formed as a unitary member by bending work. However, another method could be provided by forming the grooves separately and then attaching them to the end portion of the paneled curtain by the use of holders previously provided inside the paneled curtain.

Through the height-adjusting foot piece hitherto used in general may be available under the top board supporting members 21, 21, a foot piece 35 which permits a particular fine height adjustment is disclosed in this invention.

In the foot piece 35 of the present invention, height adjustment is accomplished by turning a cap 41 which is fitted to a cylindrical support piece 39. The support piece 39 is rendered nonrotatable by upper mounting parts 37 which are inserted into the locating holes 42 in the bottom plate 36 of the top board supporting member. An uprightly positioned threaded stud 40 for height adjustment is mounted on the interior bottom of the cap 41. The threaded stud 40 is threadingly engaged with a threaded hole 38 located in the lower part of the cylindrical piece 39.

A desk constructed according to the disclosed invention can be fabricated in a very short period of time in a store or at a place where the desk will be used by choosing pairs of paneled legs and paneled frames as desired from among those delivered from the workshop in the form of component parts.

By arranging the attachment beams 28 provided on the top board supporting members 21, 21 face to face with each other, by fitting the insertion openings 32B of the holding grooves 32, 32 on both ends of the paneled curtain 33 into the upper guide portions 28B of the attachment beam 28, and by thrusting the paneled curtain 33 downwardly, the three members become fixed to each other.

The top board supporting members 21 can be composed in several modified combinations depending on the selection of component parts. The attachment process for connecting the top board with the top board supporting members is carried out as follows: a top board 1 is chosen according to the kind of combination desired, as shown in FIGS. 3 and 5; the locking devices 7 are secured to the required locking mechanism mounting apertures 3; the leg fixing parts of the fixing device are disposed face to face with the fixing recesses 26 of the top board supporting members 21; the top board 1 is downwardly thrusted to cause every fixing device to take a proper position in compliance with the tapered guide part 27 of said top board mounting parts 24; the locking piece 12 which protrudes from the bottom end of the tapered part 20 is turned around the pin 13 to compress the spring 16 as the wedge-like tapered surface of the hook-like protrusion 11 contacts the lower part of said tapered guide part 27; the hook-like protrusion withdraws inwardly further than the tapered surface 20 (indicated by a short dashed line) and then returns to the initial position by expansion of the spring 16 acting at a position outside the bottom opening of the tapered guide portion 27; a notch of said non-skid part 10 is brought into engagement with the edge of said engagement opening 25 of the top board supporting member 24 thereby completing the attachment process.

As described above, since a number of fixing devices in engagement with the top board through relative displacement parallel with the surface of top board are fixed to the top board supporting members through the relative displacement perpendicular to and parallel with the aforementioned displacement with the top board, the desk, after assembly, possesses none of the troubles such as slackness, relative displacement of the parts, or deformation even when subjected to vibration or shock, wherein the fixing devices correct slight deformation occuring around the connecting portions of the top board and supporting members with resisting stress acting therein every time required.

Further, the top board supporting members are in straight-line connection with each other through the fixing beams and cooperating holding grooves and, therefore, are of more sturdy construction and easier to fabricate than when they are in point-connection by means of screws.

The disclosed embodiment of this invention will eliminate the drawbacks of conventional desks. A variety of desk styles can be quickly and easily fabricated by the common use of the same components in various desired desk configurations thus achieving the objects of this invention; that is, increasing productivity, and permitting cost reduction through reduced production, management and shipping costs.

The present invention may be embodied in other specific forms without departing from the sprit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A desk comprising:
   a top board;
   a plurality of mounting apertures located on an underside of the top board;
   a plurality of top board supporting members;
   a plurality of mounting parts located in each of the supporting members; and
   a plurality of locking means, each locking means including a first portion adapted for attachment to a selected one of the top board mounting apertures and a second portion adapted to be inserted into a selected one of the supporting member mounting parts for mounting the top board to the supporting members, said second portion comprising a detent having a hook-like protrusion at a lower end and being pivotally supported at an upper end and a spring biasing the detent to an outwardly extending position for engagement with the supporting member mounting parts.

2. The desk as claimed in claim 1, wherein the top board includes a plurality of reinforcing channels, the mounting apertures being located in the reinforcing channels.

3. The desk as claimed in claim 2, wherein the reinforcing channels include stepped recesses, the mounting apertures being located in the stepped recesses.

4. The desk as claimed in claim 1, wherein the top board mounting apertures each comprise a first insertion-removal portion and a second connected engagement portion, the insertion-removal portion being larger than the engagement portion, the combined insertion-removal and engagement portions having a key-like appearance.

5. A desk as claimed in claim 4, wherein a plurality of mounting apertures are adapted to be interengaged with mounting parts of each of the top board supporting members and wherein at least two mounting apertures adapted to be interengaged with each top board supporting member respectively, are aligned in a non-parallel orientation.

6. A desk as claimed in claim 1, wherein the mounting parts formed in the supporting member as in the form of an inverted truncated rectangular pyramid and are positioned at spaced locations along the supporting member top edges.

7. A desk as claimed in claim 6, wherein a lowermost edge of the inverted truncated pyramid forms a locking surface for locking engagement with the locking means.

8. A desk as claimed in claim 1, wherein adjacent top board supporting members are rigidly interconnected by attachment means.

9. A desk as claimed in claim 8, wherein the attachment means comprises a vertical attachment beam and a cooperating vertical holding groove.

10. A desk as claimed in claim 9, wherein the attachment beam is generally T-shaped in cross-section, an upper portion being of reduced dimensions to facilitate insertion into the cooperating holding groove.

11. A desk as claimed in claim 10, wherein the vertical cooperating holding groove is open at its lower end to facilitate insertion of the attachment beam and is closed at its upper end.

12. A desk comprising:
a top board;
a plurality of mounting apertures located on an underside of the top board;
a plurality of top board supporting members;
a plurality of mounting parts located in each of the top board supporting members, said mounting parts being in the form of an inverted truncated regular pyramid and being positioned at spaced locations along the supporting member top edges, a lowermost edge of said inverted truncated pyramid forming a locking surface for locking engagement with the locking means;
a plurality of locking means, each locking means including a first portion adapted for attachment to a selected one of the top board mounting apertures and a second portion adapted to be inserted into a selected one of the supporting member mounting parts for mounting the top board to the supporting members.

13. The desk as claimed in claim 12, wherein the top board includes a plurality of reinforcing channels, the mounting apertures being located in the reinforcing channels.

14. The desk as claimed in claim 13, wherein the reinforcing channels include stepped recesses, the mounting apertures being located in the stepped recesses.

15. The desk as claimed in claim 12, wherein the top board mounting apertures each comprise a first insertion-removal portion being larger than the engagement portion, the combined insertion-removal and engagement portions having a key-like appearance.

16. A desk as claimed in claim 15, wherein a plurality of mounting apertures are adapted to be interengaged with mounting parts of each of the top board supporting members and wherein at least two mounting apertures adapted to be interengaged with each top board supporting member respectively, are aligned in a non-parallel orientation.

17. A desk as claimed in claim 12, wherein adjacent top board supporting members are rigidly interconnected by attachment means.

18. A desk as claimed in claim 17, wherein the attachment means comprises a vertical attachment beam and a cooperating vertical holding groove.

19. A desk as claimed in claim 18, wherein the attachment beam is generally T-shaped in cross-section, an upper portion being of reduced dimensions to facilitate insertion into the cooperating holding groove.

20. A desk as claimed in claim 19, wherein the vertical cooperating holding groove is open at its lower end to facilitate insertion of the attachment beam and is closed at its upper end.

21. A desk comprising:
a top board;
a plurality of mounting apertures located on an underside of the top board;
a plurality of top board supporting members;
attachment means for rigidly interconnecting adjacent top board supporting members, said attachment means comprising a vertical attachment beam and a cooperating vertical holding groove, said attachment beam being generally T-shaped in cross-section, an upper portion being of reduced dimensions to facilitate insertion into a cooperating vertical holding groove, said vertical cooperating holding groove being open at its lower end to facilitate insertion of said attachment beam and being closed at its upper end;
a plurality of mounting parts located in each of the supporting members; and
a plurality of locking means, each locking means including a first portion adapted for attachment to a selected one of the top board mounting apertures and a second portion adapted to be inserted into a selected one of the supporting member mounting parts for mounting the top board to the supporting members.

22. The desk as claimed in claim 21, wherein the top board includes a plurality of reinforcing channels, the mounting apertures being located in the reinforcing channels.

23. The desk as claimed in claim 22, wherein the reinforcing channels include stepped recesses, the mounting apertures being located in the stepped recesses.

24. The desk as claimed in claim 21, wherein the top board mounting apertures each comprise a first insertion-removal portion and second connected engagement portion, the insertion-removal portion being larger than the engagement portion, the combined insertion-removal and engagement portions having a key-like appearance.

25. A desk as claimed in claim 24, wherein a plurality of mounting apertures are adapted to be interengaged with mounting parts of each of the top board supporting members and wherein at least two mounting apertures adapted to be interengaged with each top board supporting member, respectively, are aligned in a non-parallel orientation.

26. A desk as claimed in claim 21, wherein the mounting parts formed in the supporting member as in the form of an inverted truncated rectangular pyramid and are positioned at spaced locations along the supporting member top edges.

27. A desk as claimed in claim 26, wherein a lowermost edge of the inenrted truncated pyramid forms a locking surface for locking engagement with the locking means.

28. A desk as claimed in claim 21, wherein the locking means comprises a detent, having a hooklike protrusion at a lower end and being pivotally supported at an upper end and a spring biasing the detent to an outwardly extending position for engagement with the supporting member mounting parts.

* * * * *